(12) United States Patent
Yamaguchi (10) Patent No.: US 7,038,502 B2
(45) Date of Patent: May 2, 2006

(54) LVDS DRIVER CIRCUIT AND DRIVER CIRCUIT

(75) Inventor: Michimasa Yamaguchi, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 16 days.

(21) Appl. No.: 10/951,676

(22) Filed: Sep. 29, 2004

(65) Prior Publication Data

US 2005/0093579 A1    May 5, 2005

(30) Foreign Application Priority Data

Sep. 30, 2003   (JP) ............................. 2003-340847

(51) Int. Cl.
*H03K 3/00*   (2006.01)
(52) U.S. Cl. ..................... 327/108; 327/112; 326/30; 326/83
(58) Field of Classification Search ........ 327/108–112; 326/30, 82, 83
See application file for complete search history.

(56) References Cited

U.S. PATENT DOCUMENTS 6,292,028 B1 *   9/2001   Tomita ...................... 326/86
6,316,964 B1 *   11/2001   Watarai ..................... 326/115

FOREIGN PATENT DOCUMENTS

JP    2000-174605 A    6/2000
JP    2001-085977 A    3/2001

* cited by examiner

*Primary Examiner*—Kenneth B. Wells
(74) *Attorney, Agent, or Firm*—Sughrue Mion, PLLC (57) ABSTRACT

A low-voltage differential signaling (LVDS) driver circuit for providing logic output and high impedance output includes a current source, an output switch circuit setting an output state, and a bypass circuit bypassing a current from the current source during high impedance output. A termination voltage is supplied to the intermediate node of the bypass circuit.

19 Claims, 7 Drawing Sheets

RELATED ART

Fig. 6

RELATED ART

LVDS DRIVER CIRCUIT AND DRIVER CIRCUIT

BACKGROUND OF THE INVENTION

1. Field of the Invention

The present invention relates to driver circuits which output signals at high speed and, particularly, to a low-voltage differential signaling (LVDS) driver circuit and a driver circuit which provide logic output and high impedance output.

2. Description of Related Art

Higher-speed and lower-voltage data transmission between large scale integrations (LSIs) has been developed recently. In such transmission systems, LSIs using a LVDS circuit are often used for LCD drivers and so on. Further, improved LVDS circuits are used for IEEE 1394.a standard of transmission system.

While an output voltage magnitude of conventional complementary metal-oxide semiconductor (CMOS) circuits is normally a power supply voltage, that of the LVDS circuit is as low as about 0.3V. Reduction of the output voltage magnitude of data output gives significant advantages such as higher transmission speed, lower power consumption, less noise in signal transmission, and higher external noise resistance.

Figure 5:
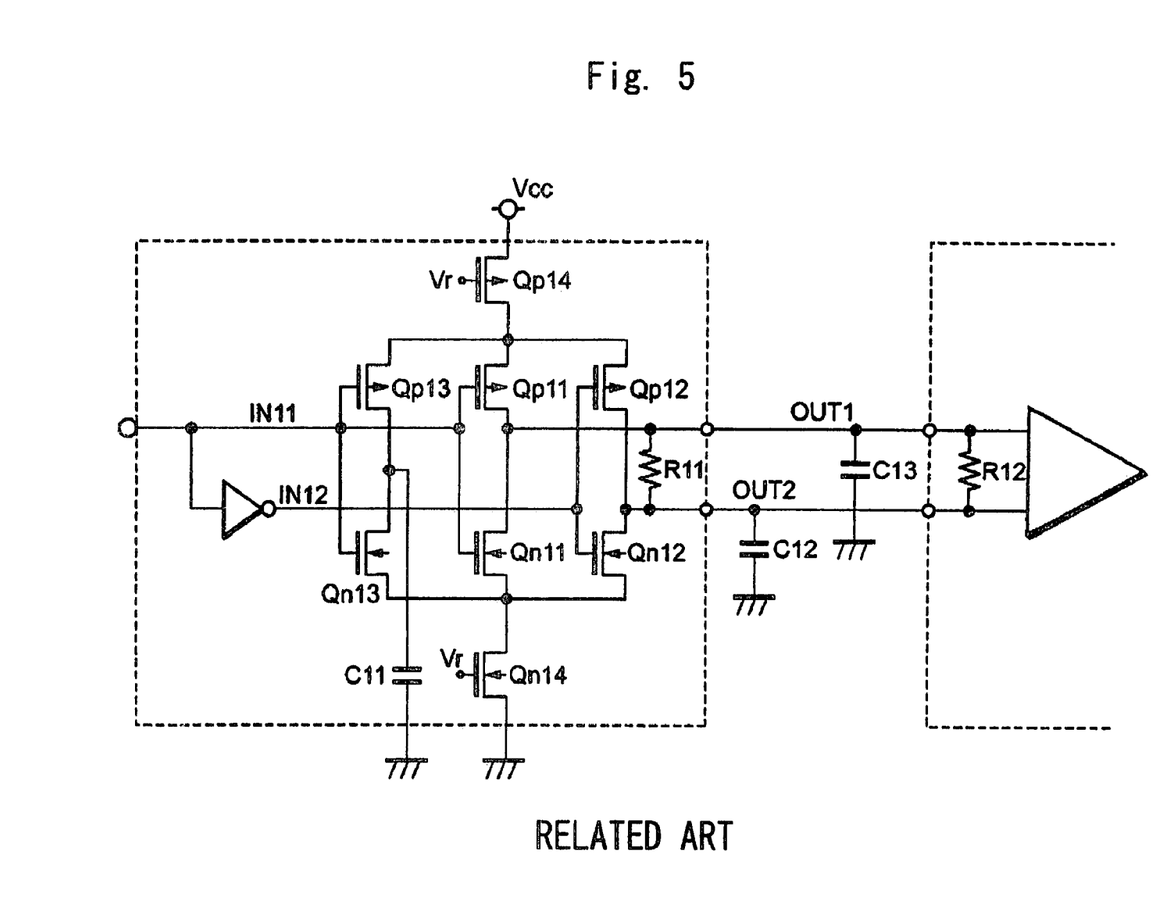
FIG. 5 is a circuit diagram of a first conventional art.

Various approaches for LVDS driver circuits to output the low output voltage magnitude reliably at high speed have been proposed. The technique disclosed in Japanese Unexamined Patent Application Publication No. 2001-085977, a first conventional art, is shown in FIG. 5. This conventional LVDS driver circuit includes a first current switch circuit having transistors Qp11 and Qn11, a second current switch circuit having transistors Qp12 and Qn12, and a third current switch circuit having transistors Qp13 and Qn13, which are connected between a current source Qp14 at the side of a supply voltage Vcc and a current source Qn14 at the side of ground GND.

The first current switch circuit switches in such a way that one output terminal is connected either the current source Qp14 or Qn14 according to a non-inverted input signal IN11. The second current switch circuit switches in such a way that the other output terminal is connected either the current source Qp14 or Qn14 according to an inverted input signal IN12. A pair of output terminals output a pair of output signals OUT1 and OUT2. The third current switch circuit switches in such a way that a capacitor C11 is connected either the current source Qp14 or Qn14 according to the non-inverted input signal IN11

A time difference between the input of the non-inverted input signal IN11 and the input of the inverted input signal IN12 causes insufficient logic output voltage magnitude. To overcome this problem, this LVDS driver circuit has the third current switch circuit so as to correct the time difference between the non-inverted and inverted input signals, thereby obtaining a desired logic output voltage magnitude.

Figure 6:
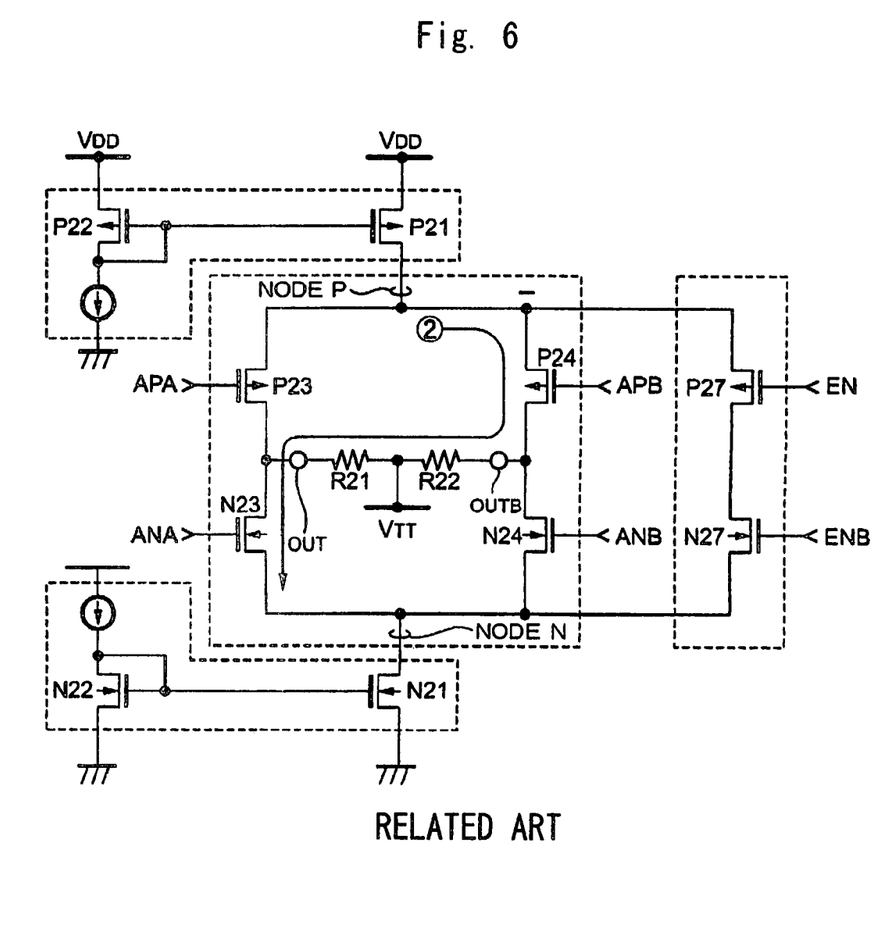
FIG. 6 is a circuit diagram of a second conventional art.

Japanese Unexamined Patent Application Publication No. 2000-174605, a second conventional art, discloses a technique to eliminate noise on output signals generated in the transition from a high impedance output state to a logic output state in the LVDS circuit which provides logic output and high impedance output. FIG. 6 shows the circuit structure of this conventional technique. A bypass circuit composed of transistors P27 and N27 is added to a normal LVDS driver circuit. In thins circuit, an input signal is inputted to a switching voltage generator circuit, which is not shown, so that the switching voltage generator circuit turns on and off transistors P23, P24, N23, and N24 according to the input signal.

Figure 7A:
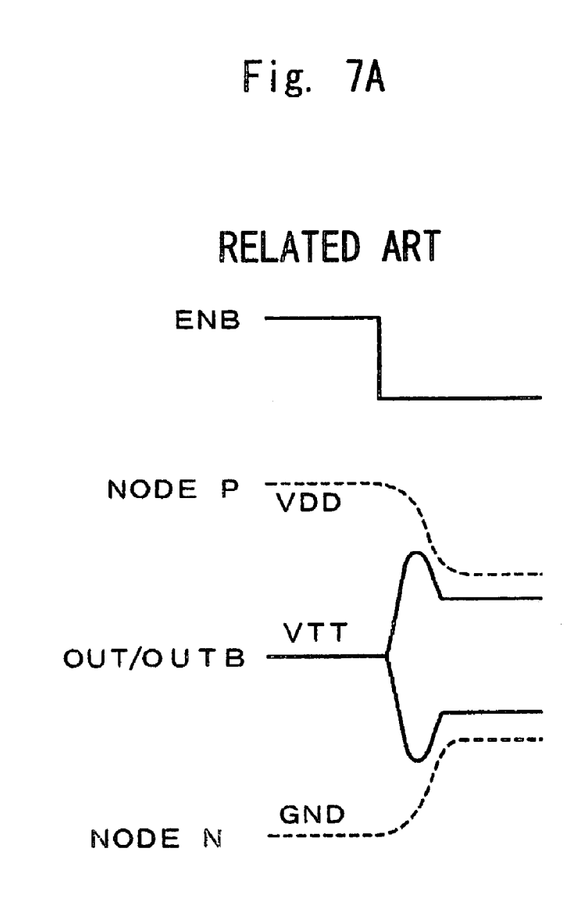
FIGS. 7A, 7B, and 7C show signal waveforms in the second conventional art.
Figure 7B:
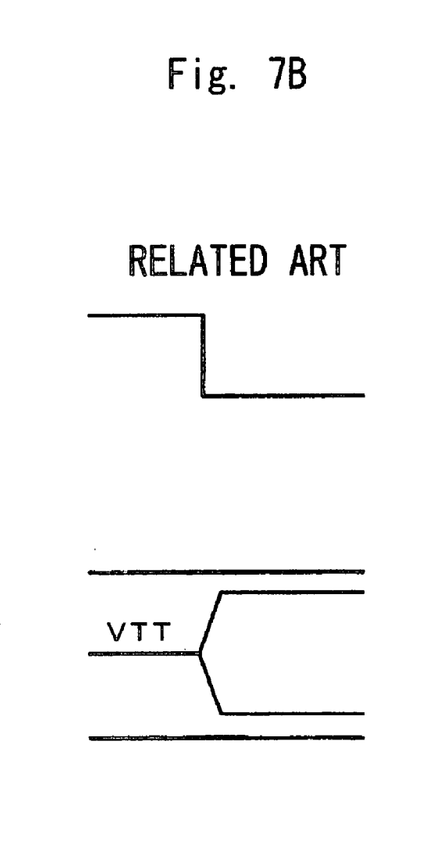
Figure 7C:
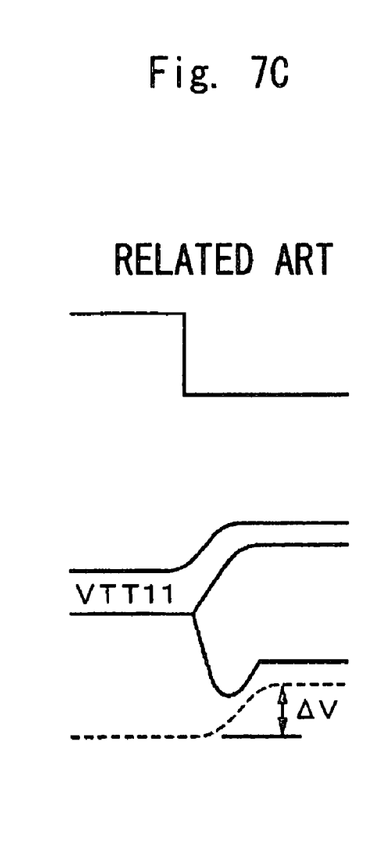

The operation of the above circuits is explained below with reference to timing charts shown in FIG. 7A to 7C. FIG. 7A is a timing chart of a normal LVDS driver circuit with no bypass circuit. In the LVDS driver circuit having no bypass circuit, an inverted enable signal ENB is inputted to a switching voltage generator circuit. The switching voltage generator circuit outputs signals APA, APB, ANA, and ANB. The conductive state of transistors P23, P24, N23, and N24 is controlled according to the signals APA, APB, ANA, and ANB. In this example, if the inverted enable signal ENB is High and the output is high impedance, the transistors P23, P24, N23, and N24 are all off, and nodes P and N are at a power supply voltage VDD and a ground voltage GND, respectively. If, then, the inverted enable signal ENB turns to Low and the circuit outputs a logic level, the transistors P23, P24, N23, and N24 turn on or off to provide a logic output in accordance with input data. In the logic output state, the node P is at a slightly higher voltage than High level, while the node N is at a slightly lower voltage than Low level.

Since the node P is at the power supply voltage VDD in the first logic output immediately after the inverted enable signal ENB is changed from High to Low, the output High level has a significant overshoot waveform due to the power supply voltage of the node P. On the other hand, since the node N is at the ground voltage GND, the output Low level has a significant undershoot waveform due to the ground voltage of the node N. Thus, the output waveforms initially swing largely and are thereby distorted greatly as shown in FIG. 7A.

To overcome the above problem, the circuit of FIG. 6 has the bypass circuit including the transistors P27 and N27 so that a current keep flowing between the nodes P and N during the high impedance output. The voltages on the nodes P and N in the high impedance output state are thereby substantially equal to those in the logic output state, which creates proper output waveforms as shown in FIG. 7B.

The bypass circuit in the circuit of FIG. 6 is, however, designed to work with a predetermined particular termination voltage. Thus, if a termination voltage different from the predetermined voltage is used, the problem of distortion of output waveform cannot be overcome with the technique of the second conventional art but remains unsolved. FIG. 7C shows the case where a voltage VTT11 which is higher than a predetermined termination voltage VTT is used as a termination voltage. In the high impedance output, the voltages of the nodes P and N are set to depend on the predetermined termination voltage VTT. On the other hand, in the logic output after the inverted enable signal ENB turns to Low level, the voltages of the nodes P and N depend on a connected termination voltage VTT11 (VTT<VTT11); as a result, they increase by $\Delta V = VTT11 - VTT$. The change in the voltages of the nodes P and N causes the output waveforms to be distorted, which does not allow for the faster data transmission. The technique disclosed in the second conventional art does not accept the use of a different termination voltage level.

The problem to be solved in the present invention is that the above-described conventional LVDS driver circuit works only with a particular termination voltage, and the use of a different termination voltage causes a voltage to change by a difference in the termination voltages, which distorts the output waveform, thus not achieving high-speed data transmission.

SUMMARY OF THE INVENTION

The present invention has been accomplished to solve the above problems and an object of the present invention is thus to provide a LVDS driver circuit which provides logic output and high impedance output, capable of working with various termination voltages, achieving high-speed transmission, and outputting a non-distorted output voltage waveform.

To these ends, according to one aspect of the present invention, there is provided a low-voltage differential signaling (LVDS) driver circuit for providing logic output and high impedance output, including a current source, an output switch circuit setting an output state, a bypass circuit being connected in parallel with the output switch circuit, bypassing a current from the current source during high impedance output, and a first termination resistor and a second termination resistor being connected in series between a first output terminal and a second output terminal of the LVDS driver circuit. A connection point of the first and second termination resistors is supplied with a termination voltage, and a voltage of an intermediate node of the bypass circuit is at substantially the same voltage as the termination voltage. This LVDS driver circuit can work with various termination voltages, achieve high-speed transmission, and output a non-distorted output voltage waveform.

The above LVDS driver circuit may further include a differential amplifier. In this differential amplifier, the termination voltage is inputted to a first input terminal, and the voltage of an output terminal is inputted to a second input terminal. The differential amplifier outputs an output signal to the intermediate node of the bypass circuit. This LVDS driver circuit can work with various termination voltages with high efficiency.

The above LVDS driver circuit may further include a third resistor, a fourth resistor, and a differential amplifier. The third and the fourth resistors are connected in series between the first and second output terminals. In the differential amplifier, a voltage of a connection point of the third and fourth resistors is inputted to a first input terminal, and the voltage of an output terminal is inputted to a second input terminal. The differential amplifier outputs an output signal to the intermediate node of the bypass circuit. This LVDS driver circuit can work with various termination voltages under various uses.

In the above LVDS driver circuit, the bypass circuit may include a first transistor and a second transistor. In the first transistor, a source is connected to a first node of the output switch circuit and a drain is connected to the intermediate node of the bypass circuit. In the second transistor, a source is connected to a second node of the output switch circuit, and a drain is connected to the intermediate node of the bypass circuit. This LVDS driver circuit can work with various termination voltages with high accuracy.

The above LVDS driver circuit may further include a first current source circuit, a second current source circuit, a third current source circuit, and a fourth current source circuit. The first and second current source circuits are connected between the output switch circuit and the bypass circuit, and a power supply voltage. The third and fourth current source circuits are connected between the output switch circuit and the bypass circuit, and a ground voltage. The first, second, third, and fourth current source circuits supply a current during logic output. The second and fourth current source circuits supply a current, while the first and third current source circuits do not supply a current during high impedance output. This LVDS driver circuit can work with various termination voltages while achieving low power consumption.

According to another aspect of the present invention, there is provided a driver circuit for outputting a signal of logic output or high impedance output through a first output terminal and a second output terminal. The driver circuit includes a first current source being connected to a first node, a second current source being connected to a second node. The driver circuit also includes a first resistor pair including a first termination resistor and a second termination resistor being connected in series with each other between the first and second output terminals, and an intermediate node of the first and second termination resistors is supplied with a termination voltage. The driver circuit also includes a first transistor pair including a first transistor and a second transistor being connected in series with each other between the first and second nodes, and an intermediate node of the first and second transistors is connected to the first output terminal. The driver circuit also includes a second transistor pair including a third transistor and a fourth transistor being connected in series with each other and in parallel with the first transistor pair, and an intermediate node of the third and fourth transistors is connected to the second output terminal. The driver circuit also includes a third transistor pair including a fifth transistor and a sixth transistor being connected in series with each other and in parallel with the first and second transistor pairs, and an intermediate node of the fifth and sixth transistors is at substantially the same voltage as the termination voltage. In the driver circuit, the first and fourth transistors, or, the second and third transistors connect the first and second current sources, and the first and second output terminals during logic output. The fifth and sixth transistors connect the first and second current sources during high impedance output. A voltage of the first and second nodes during the logic output is substantially the same as a voltage of the first and second nodes during the high impedance output. This driver circuit can work with various termination voltages, achieve high-speed transmission, and output a non-distorted output voltage waveform.

The above driver circuit may further include a differential amplifier. In this differential amplifier, a first input terminal is connected to the intermediate node of the second resistor pair, a second input terminal is connected to an output terminal, and the output terminal is connected to the intermediate node of the third transistor pair. This driver circuit can work with various termination voltages with high efficiency.

The above driver circuit may further include a second resistor pair and a differential amplifier. The second resistor pair comprises a third resistor and a fourth resistor which are connected in series with each other and in parallel with the first resistor pair. In the differential amplifier, a first input terminal is connected to the intermediate node of the second resistor pair, a second input terminal is connected to an output terminal, and the output terminal is connected to the intermediate node of the third transistor pair. This driver circuit can work with various termination voltages under various uses.

In the above driver circuit, a current on the first and second nodes during the high impedance output may be smaller than a current on the first and second nodes during the logic output. This driver circuit can work with various termination voltages while achieving low power consumption.

The above driver circuit may further include a third current source which is connected to the first node, and a fourth current source which is connected to the second node. During the logic output, the first and fourth transistors, or, the second and third transistors connect the first and third current sources, the second and fourth current sources, and the first and second output terminals. During the high impedance output, the fifth and sixth transistors connect the first and second current sources, and do not connect the third and fourth current sources. This driver circuit can work with various termination voltages while achieving still lower power consumption.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

A LVDS driver circuit according to the present invention provides logic output and high impedance output and includes a current source, an output switch circuit which sets an output state, and a bypass circuit which bypasses the current from the current source during the high impedance output. The LVDS driver circuit supplies a termination voltage to an intermediate node of the bypass circuit to substantially equalize the voltages of nodes A and B during the logic output and during the high impedance output, thereby creating an output waveform which is not distorted regardless of a different termination voltage.

Further, the circuit includes a plurality of current source circuits so as to apply a different constant current during the logic output and during the high impedance output, thereby reducing power consumption.

First Embodiment

Figure 1:
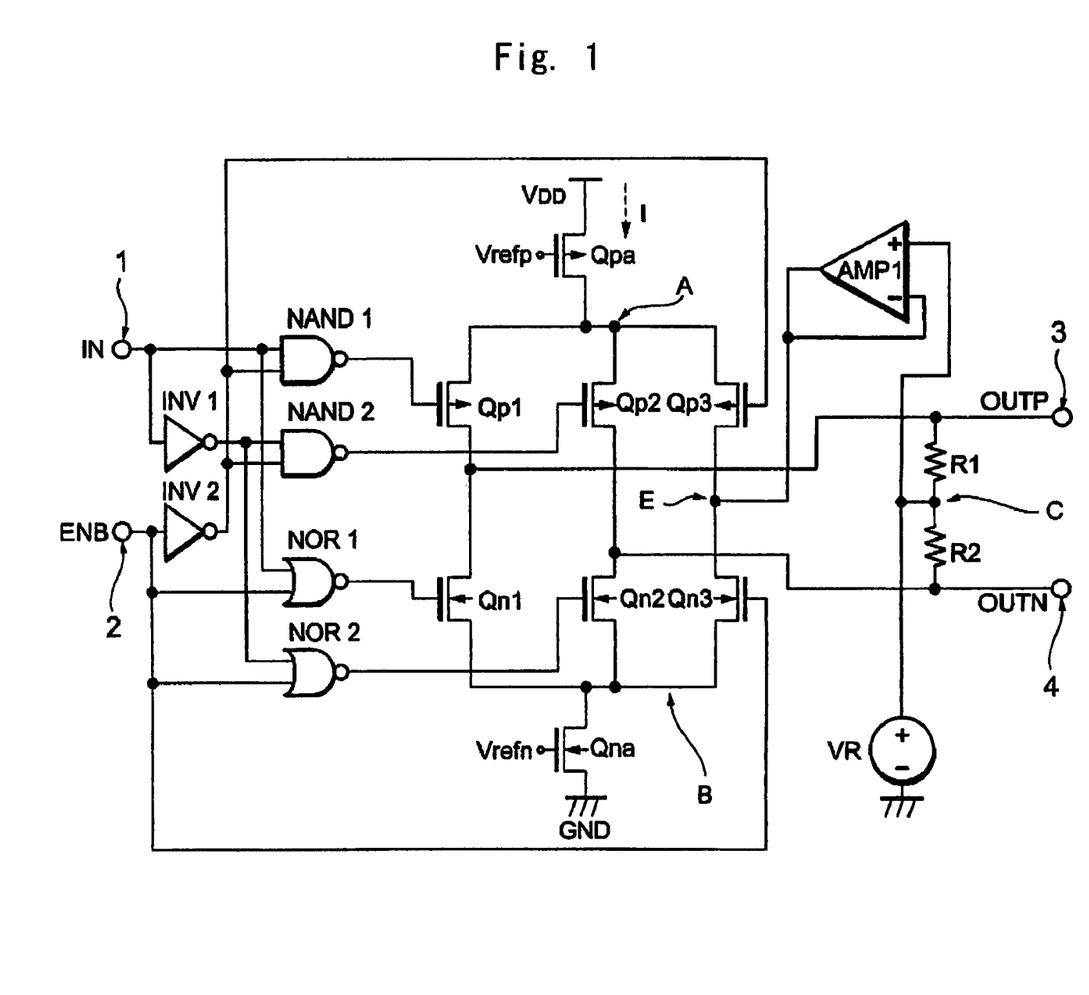
FIG. 1 is a circuit diagram of a first embodiment of the present invention.
Figure 2A:
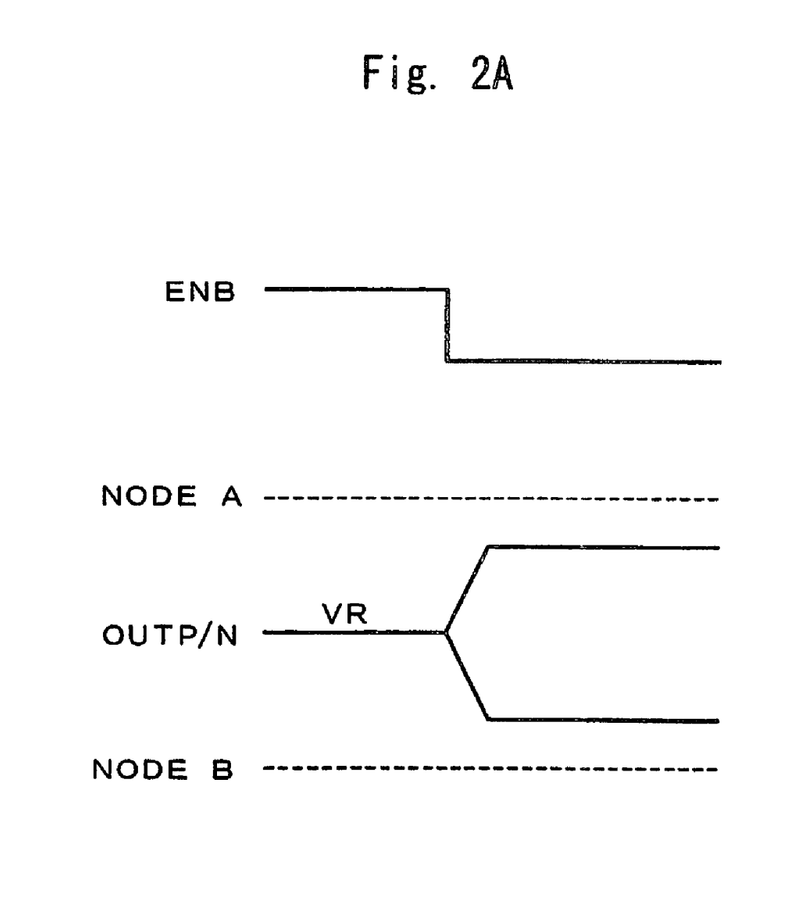
FIGS. 2A and 2B show signal waveforms in the first embodiment of the present invention.
Figure 2B:
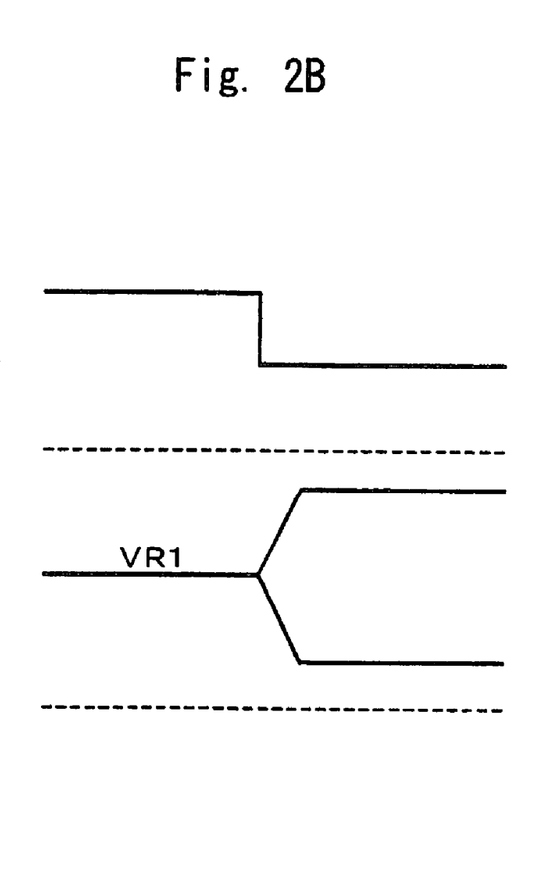

FIG. 1 shows a circuit diagram according to a first embodiment of this invention, and FIGS. 2A and 2B show signal waveforms in the first embodiment. According to this embodiment, in a LVDS driver circuit which provides logic output and high impedance output, an intermediate node E, which is a connection point between transistors Qp3 and Qn3 of a bypass circuit is at the same voltage as a termination voltage VR. Thereby, the voltages of a node A is not changed during the high impedance output and during the logic output. The voltages of a node B is not changed during the high impedance output and during the logic output. This structure allows the LVDS driver circuit to work with various termination voltages and output a desired output level. The logic output means the state of outputting a logic level "1" or "0" in accordance with input data, and the high impedance output, which is normally written "Z", means the state of outputting high impedance seen by an output terminal.

The structure of the circuit of the first embodiment is explained below with reference to FIG. 1. Input data IN from an input terminal 1 is supplied to a 2-input NAND circuit NAND1, a 2-input NOR circuit NOR1, and an inverter circuit INV1. An inverted enable signal ENB from an input terminal 2 is supplied to the 2-input NOR circuit NOR1, a 2-input NOR circuit NOR2, an inverter circuit INV2, and the gate of the transistor Qn3 of the bypass circuit. The output of the inverter circuit INV1 which inverts the input data IN is supplied to a 2-input NAND circuit NAND2 and the 2-input NOR circuit NOR2. The output of the inverter circuit INV2 which inverts the inverted enable signal ENB is supplied to the 2-input NAND circuit NAND1, the 2-input NAND circuit NAND2, and the gate of the transistor Qp3 of the bypass circuit. The output of the NAND circuit NAND1 is supplied to the gate of a transistor Qp1 of the output switch circuit, the output of the NAND circuit NAND2 is to the gate of a transistor Qp2, the output of the NOR circuit NOR1 is to the gate of a transistor Qn1, and the output of the NOR circuit NOR2 is to the gate of a transistor Qn2. These logic circuits turn on or off the output switch circuit in accordance with input signals to set a desired output state.

In a transistor Qpa constituting a first constant current source, the source is connected to a power supply voltage VDD, the drain is to the node A, and the gate is to a first reference voltage Vrefp. In a transistor Qna constituting a second constant current source, the drain is connected to the node B, the source is to a ground voltage GND, and the gate is to a second reference voltage Vrefn.

The output switch circuit is composed of the transistors Qp1, Qp2, Qn1, Qn2, and termination resistors R1 and R2. The source of the transistor Qp1 is connected to the node A, the gate is to the output of the NAND circuit NAND1, and the drain is to an output terminal 3, providing output OUTP. The drain of the transistor Qn1 is connected to the output terminal 3, the gate is to the output of the NOR circuit NOR1, and the source is to the node B. The source of the transistor Qp2 is connected to the node A, the gate is to the output of the NAND circuit NAND2, and the drain is to an output terminal 4, providing output OUTN. The drain of the transistor Qn2 is connected to the output terminal 4, the gate is to the output of the NOR circuit NOR2, and the source is to the node B. The termination resistors R1 and R2 are connected in series between the output terminals 3 and 4. A termination voltage VR is applied to a node C, which is a connection point between the termination resistors R1 and R2.

The bypass circuit is composed of the transistors Qp3, Qn3, and a differential amplifier AMP1. The source of the transistor Qp3 is connected to the node A, the gate is to the output of the inverter circuit INV2, and the drain is to the intermediate node E. The drain of the transistor Qn3 is connected to the intermediate node E, the gate is to the input terminal 2 providing the inverted enable signal ENB, and the source is to the node B. The non-inverting input of the differential amplifier AMP1 is connected to the termination voltage VR, the inverting input of AMP1 is connected to the intermediate node E, and the output of AMP1 is also connected to the intermediate node E. Thus, the differential amplifier AMP1 amplifies a voltage difference between the termination voltage VR and the intermediate node E, and then outputs it to the intermediate node E, thereby equalizing the voltages of the intermediate node E and the termination voltage VR.

The operation of this circuit is explained hereinafter with reference to FIG. 2. The transistors Qpa and Qna of the constant current source circuit are supplied with the reference voltages Vrefp and Vrefn, respectively, at their gates, and operate in a saturated region to continuously pass a constant current. In accordance with the input level of the inverted enable signal ENB and the input data IN, the output terminal provides high impedance output "Z", or logic output "1" or "0".

In the case where Low level of the inverted enable signal ENB is input, in the bypass circuit, the transistors Qp3 and Qn3 are both turned off, but the intermediate node E remains at the termination voltage VR from the differential amplifier AMP1. At the same time, in the output switch circuit, the output level of the NAND circuits NAND1, NAND2 and the NOR circuits NOR1, NOR2 are determined in accordance with the input data IN, and the transistors Qp1, Qp2, Qn1, and Qn2 are thereby turned on or off.

For example, if High level of input data IN is input, the NAND1 outputs Low level, NAND2 outputs High level, NOR 1 outputs Low level, and NOR2 outputs High level, which turns on the transistors Qp1 and Qn2 and turns off the transistors Qp2 and Qn1. Hence, a current flows through the VDD, transistor Qpa, Qp1, termination resistor R1, R2, transistor Qn2, Qna, and GND. If, in this state, the termination voltage VR is 1.2V, the current from the constant current source is 3 mA, the resistance value of the termination resistors R1 and R2 is 50 ohms, the output OUTP is 1.35V and OUTN is 1.05V, thus providing an output voltage with a voltage magnitude of 0.3V. The node A is at a slightly higher voltage than 1.35V, and the node B is slightly lower voltage than 1.05V. The slightly higher or lower voltage is higher or lower by a value corresponding to the voltage between the drain and source of the transistors Qp1 and Qn2 operating in the triode region, which is as low as about 0.2V.

When High level of input data IN is input and the output OUTP is 1.35V and OUTN is 1.05V, the logic output is defined as the logic level "1".

If, on the contrary, Low level of input data IN is input, the NAND1 outputs High level, NAND2 outputs Low level, NOR 1 outputs High level, and NOR2 outputs Low level, which turns off the transistors Qp1 and Qn2 and turns on the transistors Qp2 and Qn1. Hence, a current flows through the VDD, transistor Qpa, Qp2, termination resistor R2, R1, transistor Qn1, Qna, and GND. As a result, the output OUTN is 1.35V and OUTP is 1.05V, and the logic output in this case is defined as the logic level "0".

On the other hand, in the case where High level of the inverted enable signal ENB is input, the NAND circuits NAND1 and NAND2 output High level, and the NOR circuits NOR1 and NOR2 output Low level regardless of the signal level of the input data IN, which turns off the transistors Qp1, Qp2, Qn1, and Qn2. The output is thereby high impedance "Z", which is at the termination voltage VR.

The gates of the transistors Qp3 and Qn3 of the bypass circuit are supplied with Low level and High level of voltages, respectively, and turned on to pass the current from the constant current source through the bypass circuit. In this state, the intermediate node E of the bypass circuit is fixed at the termination voltage VR (1.2V) by the differential amplifier AMP1. Thus, the values of the transistors Qp3 and Qn3 are set so that the node A is at a slightly higher voltage than 1.35V, and, the node B is at a slightly lower voltage than 1.05V. This setting allows the levels of the nodes A and B to be substantially the same during the high impedance output and during the logic output, as shown in FIG. 2A. In this structure, it is possible to create a non-distorted output waveform in the transition from the high impedance output state to the logic output state.

FIG. 2B shows an operation waveform in the case where the termination voltage VR is replaced by a different voltage VR1, which is, for example, 1.6V, under the above-described circuit conditions. If Low level of the inverted enable signal ENB is input, since the transistors Qpa and Qna of the constant current source each operate in a saturated region, the logic output is 1.6±0.15V in accordance with the termination voltage VR1, the node A is at slightly higher voltage than 1.6±0.15V, and the node B is slightly lower voltage than 1.6−0.15V.

Similarly, if High level of the inverted enable signal ENB is input, all the transistors of the output switch circuit are turned off, and the transistors of the bypass circuit are turned on; thus, a current flows through the bypass circuit. Since the intermediate node E connecting between the transistors of the bypass circuit remains at the termination voltage VR1, the voltage levels at the nodes A and B in this state are substantially equal to the levels in the logic output state.

The values of the constant current sources, resistors, and termination voltages are shown by way of example only, and those values may be determined based on a desired output voltage magnitude. Further, though the termination voltage VR is supplied to the intermediate node E via the differential amplifier in the above-described case, VR may be directly connected to the intermediate node E. In this case, the voltage at the intermediate node E is fixed by the voltage source of the termination voltage VR.

As described in the foregoing, the bypass circuit which bypasses a constant current in the high impedance output state is included in the LVDS driver circuit which provides outputs including high impedance output, and the intermediate node E connecting between the transistors Qp3 and Qn3 of the bypass circuit is set at the same voltage as the termination voltage VR. The voltages of the nodes A and B thereby correspond to the termination voltage VR both during the high impedance output and during the logic output, thereby reducing a change in the voltages of the nodes A and B in the transition from the high impedance output state to the logic output state. This structure allows the LVDS driver circuit to work with a different termination voltage and provide a normal (non-distorted) output level.

Second Embodiment

Figure 3:
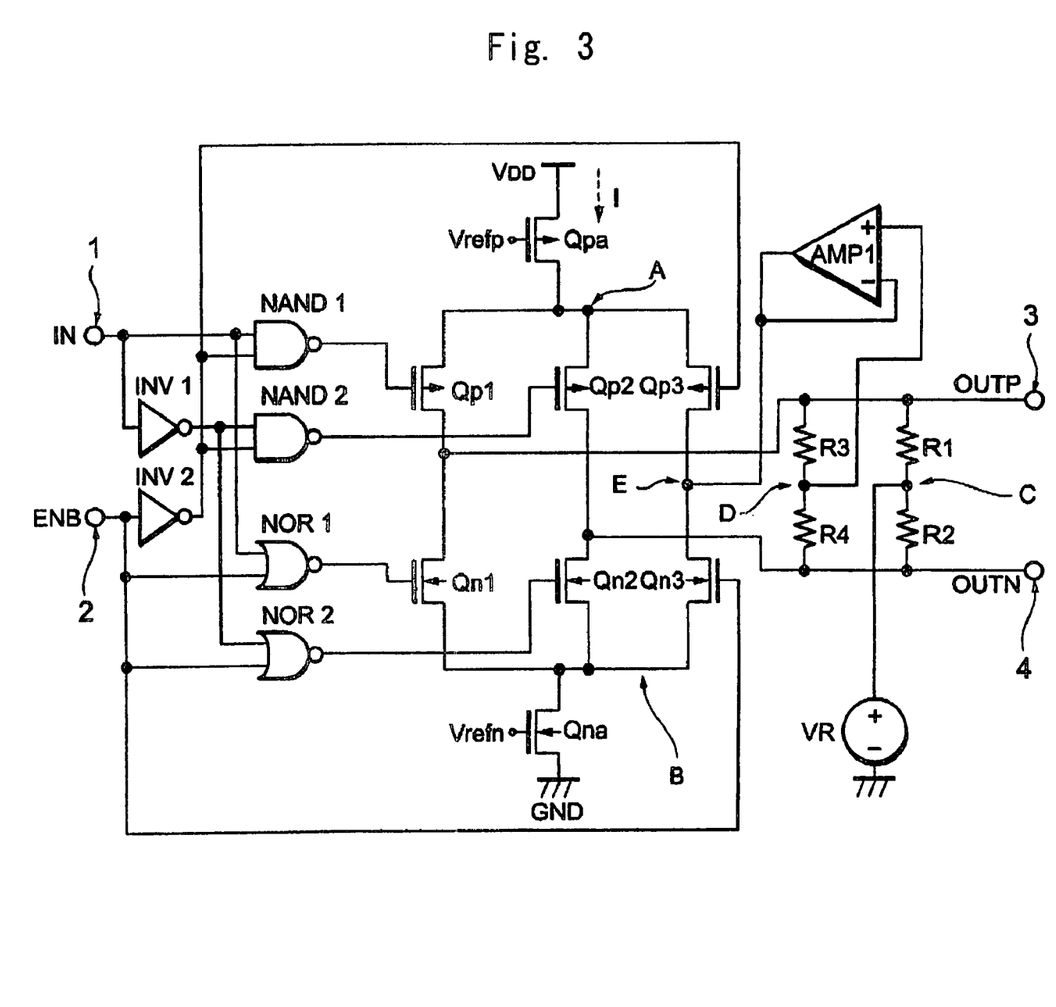
FIG. 3 is a circuit diagram of a second embodiment of the present invention.

A second embodiment of the present invention is explained hereinafter with reference to FIG. 3. As shown in FIG. 3, the circuit includes resistors R3 and R4, which are connected in series between the output terminals and have the same resistance value. In this embodiment, the termination voltage VR is not directly input to the non-inverting input of the differential amplifier AMP1 of the bypass circuit, but is input to a node D, which is a connection point between the resistors R3 and R4. In FIG. 3, the same elements as in FIG. 1 are denoted by the same reference symbols, and redundant description is omitted.

Recently, LVDS circuits are used in various systems and the like, and therefore they are required to meet a great variety of uses. For example, there may be a case where termination voltages and termination resistors are not incorporated into an integrated circuit but connected externally. The second embodiment is a variant embodiment of the invention to meet various uses, and it includes the resistors R3 and R4 between the output terminals.

For example, the termination resistors R1, R2, and the power source of the termination voltage VR is placed outside of the integrated circuit, and the other part of the termination resistors R1, R2, and the power source of the termination voltage VR is placed inside the integrated circuit. The second embodiment shows that a non-distorted output signal with no glitch noise can be obtained also in the case where the termination resistors R1, R2, and the power source of the termination voltage VR is placed outside of the integrated circuit.

If High level of inverted enable signal ENB is input and the circuit provides high impedance output, the transistors of the output switch circuit are all turned off, and the transistors Qp3 and Qn3 of the bypass circuit are turned on. Since all the transistors of the output switch circuit are off, the outputs OUTP and OUTN are both the termination voltage VR, and the node D connecting between the resistors R3 and R4 is also at the termination voltage VR. Thus, the intermediate node E is fixed at the termination voltage VR by the differential amplifier AMP1.

If, on the other hand, Low level of inverted enable signal ENB is input and the circuit provides logic output, the transistors Qp3 and Qn3 of the bypass circuit are turned off and the transistors of the output switch circuit are turned on or off in accordance with the input data. As is the case with the first embodiment, the termination resistors R1 and R2 are set to 50 ohms, the current from the constant current source is 3 mA, and the termination voltage is VR. The resistors R3 and R4 are set to have the same resistance values, several tens to several thousands higher than the value of the resistors R1 and R2. Thus, though the constant current from the constant current source is divided into two current paths, on thorough the resistors R1, R2 and the other thorough the resistors R3, R4, the ratio of the current flowing through the path with the resistors R3 and R4 is significantly lower; therefore, the effect on the voltage levels of the nodes A, B, and the output voltage level are negligible.

In this state, the outputs OUTP and OUTN are either one of VR±0.15V in accordance with the input data. Thus, the intermediate node D, a connection point of the resistors R3 and R4, is at the termination voltage VR. Hence, the intermediate node E of the bypass circuit is fixed at the termination voltage level by the differential amplifier AMP1. The intermediate node E is thereby at the termination voltage both during the high impedance output and during the logic output, just like the first embodiment, thus having the same advantages. The second embodiment also provides the LVDS driver circuit which provides a normal (non-distorted) output level, using a different termination voltage.

The second embodiment solves a problem which can occur in the first embodiment. In the first embodiment, a constant termination voltage VR from an external power source is applied to the intermediate node C between the termination resistors R1 and R2. Thus, the voltage of the node C is always constant.

The case of connecting an external load Rz, which is not shown, to the output terminals 3 and 4 in the first embodiment is explained below. If the external load Rz is almost non-conductive, a current I flows through the path of transistors Qpa, Qp1, termination resistors R1, R2, and transistors Qn2, Qna, or the path of transistors Qpa, Qp2, termination resistors R2, R1, and transistors Qn1, Qna, during the logic output. The voltage of Vout=$\{(R1+R2)//Rz\}*I$ is thereby generated between the output terminals 3 and 4. The term $(R1+R2)//Rz$ indicates a resistance value when (R1+R2) and Rz are connected in parallel.

On the other hand, if the external load Rz is conductive, a current flows from the node C to the output terminals 3 and 4. If the current value is Ix, the voltage of the output terminals 3 and 4 drops by the amount of Ix*R1 or Ix*R2 compared to when the current Ix does not flow. This causes an intermediate voltage Vcm between the output terminals 3 and 4 to vary by the amount of (Ix*R1+Ix*R2)/2 compared to the voltages of the nodes C and E. The voltage of the node E determines the voltages of the nodes A and B during the high impedance output, and the voltage of the output terminals 3 and 4 determines the voltages of the nodes A and B during the logic output.

Since the voltage of the node E during the high impedance output differs from that during the logic output by (Ix*R1+Ix*R2)/2, the voltages of the nodes A and B during the high impedance output differs from those during the logic output accordingly. Hence, the external load Rz which is conductive is used in the first embodiment, voltage variation occurs in the nodes A and B in the transition from the high impedance state to the logic output state, causing glitch noise to occur in external output.

In the second embodiment also, the intermediate voltage Vcm between the output terminals 3 and 4 and the voltage of the node C differ if the external load Rz is conductive, as is the case with the first embodiment. To avoid the problem, the resistors R3 and R4 are connected between the output terminals 3 and 4 in the second embodiment. In this configuration, the intermediate voltage Vcm between the output terminals 3 and 4 is generated in the node D under the influence of the external load Rz during the logic output. The voltage of the node D is then inputted to the differential amplifier AMP1, thereby equalizing the voltage of the node E to the voltage of the node D.

In this way, the second embodiment 2 is capable of equalizing the voltage of the node A and B during the high impedance to that during the logic output regardless of the external load. It is thereby possible to obtain a desired wave form with no glitch noise on the external output in the transition from the high impedance output to the logic output.

Third Embodiment

Figure 4:
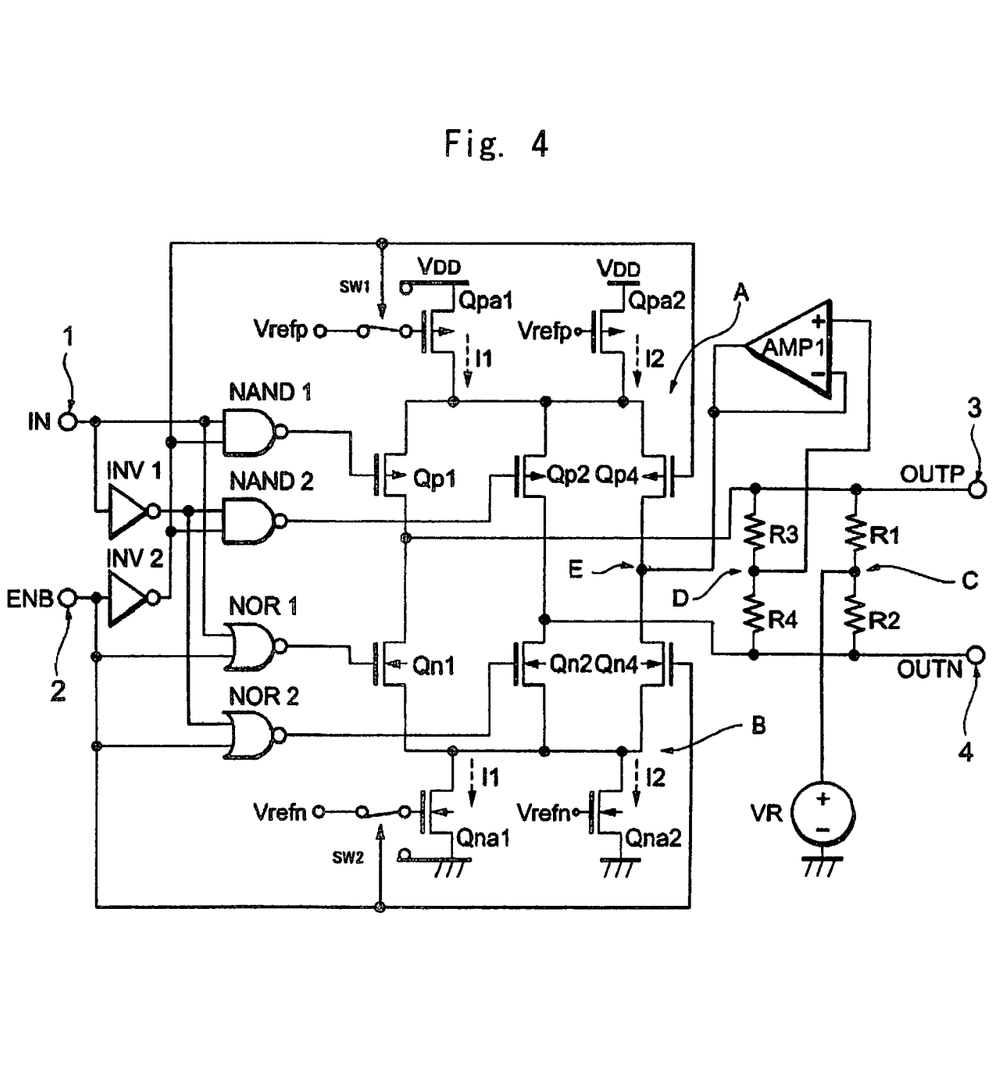
FIG. 4 is a circuit diagram of a third embodiment of the present invention.

In a third embodiment, the value of the constant current source is set smaller in the high impedance output state than in the logic output state in order to reduce power consumption. FIG. 4 shows the circuit structure of this embodiment. As shown in FIG. 4, the transistors Qpa and Qna are each divided into two transistors Qpa1, Qpa2, and Qna1, Qna2, respectively. Further, the transistors Qp3 and Qn3 are replaced by transistors Qp4 and Qn4. In FIG. 4, the same elements as in FIG. 3 are denoted by the same reference symbols, and redundant description is omitted.

In this circuit, the transistors Qpa and Qna are each divided into two transistors Qpa1, Qpa2, and Qna1, Qna2, respectively. The source of the transistor Qpa2 is connected to the power supply voltage VDD, the drain is to the node A, and the gate is to the reference voltage Vrefp. The source of the transistor Qpa1 is connected to the power supply voltage VDD, the drain is to the node A, and the gate is to a switch SW1. The switch SW1 changes over the connection to the reference voltage Vrefp and to the power supply voltage VDD. With the operation of the switch SW1, the gate of the transistor Qpa1 is supplied with the reference voltage Vrefp when the inverting signal of the inverted enable signal ENB is High, while supplied with the power supply voltage VDD when it is Low.

The source of the transistor Qna2 is connected to the ground voltage GND, the drain is to the node B, and the gate is to the reference voltage Vrefn. The source of the transistor Qna1 is connected to the ground voltage GND, the drain is to the node A, and the gate is to a switch SW2. The switch SW2 changes over the connection to the reference voltage Vrefn and to the ground voltage GND. With the operation of the switch SW2, the gate of the transistor Qna1 is supplied with the ground voltage GND when the inverted enable signal ENB is High, while supplied with the reference voltage Vrefn when it is Low.

In this structure, if the inverted enable signal ENB is Low level and the circuit provides logic output, the gates of the transistors Qpa1 and Qna1 are each connected to the reference voltages and function as a constant current source to supply a constant current I1. Further, the transistors Qpa2 and Qna2 also function as a constant current source to supply a constant current I2. If I=I1+I2, it is the same as the current in the second embodiment.

If, on the other hand, the inverted enable signal ENB is High level and the circuit provides high impedance output, the gates of Qpa1 and Qna1 are each connected to the power supply voltage VDD and the ground voltage GND, respectively, and turned off, not supplying the current I1. Thus, only the transistors Qpa2 and Qna2 function as a constant current source to supply the constant current I2. Hence, the current from the constant current source is lower during the high impedance output. The transistors Qp4 and Qn4 connected to the termination voltage at the intermediate node E are supplied with a low constant current I2, and the voltage level of the nodes A and B are set to be substantially the same as those during the logic output.

As described in the foregoing, this embodiment supplies a normal constant current during the logic output for high-speed transmission, while supplying a lower constant current during the high impedance output where the high-speed operation is not required. It is thereby possible to obtain the LVDS driver circuit capable of high-speed transmission with low power consumption.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims. For example, through the third embodiment is applied to the second embodiment, it may be applied to the first embodiment. Further, the termination voltage may be directly applied to the intermediate node E of the bypass circuit.

What is claimed is:

1. A low-voltage differential signaling (LVDS) driver circuit for providing logic output and high impedance output, comprising:
    a current source;
    an output switch circuit setting an output state;
    a bypass circuit being connected in parallel with the output switch circuit and bypassing a current from the current source during high impedance output; and
    a first termination resistor and a second termination resistor being connected in series between a first output terminal and a second output terminal of the LVDS driver circuit,
    wherein a connection point of the first and second termination resistors is supplied with a termination voltage, and
    a voltage of an intermediate node of the bypass circuit is at substantially the same voltage as the termination voltage.

2. The LVDS driver circuit according to claim 1, further comprising:
    a differential amplifier, in which the termination voltage is inputted to a first input terminal, and the voltage of an output terminal is inputted to a second input terminal, the differential amplifier outputting an output signal to the intermediate node of the bypass circuit.

3. The LVDS driver circuit according to claim 2, wherein the bypass circuit comprises a first transistor including a source being connected to a first node of the output switch circuit and a drain being connected to the intermediate node of the bypass circuit, and a second transistor including a source being connected to a second node of the output switch circuit and a drain being connected to the intermediate node of the bypass circuit.

4. The LVDS driver circuit according to claim 2, further comprising:
    a first current source circuit and a second current source circuit being connected between the output switch circuit and the bypass circuit, and a power supply voltage; and
    a third current source circuit and a fourth current source circuit being connected between the output switch circuit and the bypass circuit, and a ground voltage,
    wherein the first, second, third, and fourth current source circuits supply a current during logic output, and
    the second and fourth current source circuits supply a current, and the first and third current source circuits do not supply a current during high impedance output.

5. The LVDS driver circuit according to claim 3, further comprising:
    a first current source circuit and a second current source circuit being connected between the output switch circuit and the bypass circuit, and a power supply voltage; and
    a third current source circuit and a fourth current source circuit being connected between the output switch circuit and the bypass circuit, and a ground voltage,
    wherein the first, second, third, and fourth current source circuits supply a current during logic output, and
    the second and fourth current source circuits supply a current, and the first and third current source circuits do not supply a current during high impedance output.

6. The LVDS driver circuit according to claim 1, further comprising:
    a third resistor and a fourth resistor being connected in series between the first and second output terminals; and
    a differential amplifier, in which a voltage of a connection point of the third and fourth resistors is inputted to a first input terminal, and the voltage of an output terminal is inputted to a second input terminal, the differential amplifier outputting an output signal to the intermediate node of the bypass circuit.

7. The LVDS driver circuit according to claim 6, wherein the bypass circuit comprises a first transistor including a source being connected to a first node of the output switch circuit and a drain being connected to the intermediate node of the bypass circuit, and a second transistor including a source being connected to a second node of the output switch circuit and a drain being connected to the intermediate node of the bypass circuit.

8. The LVDS driver circuit according to claim 6, further comprising:

a first current source circuit and a second current source circuit being connected between the output switch circuit and the bypass circuit, and a power supply voltage; and a third current source circuit and a fourth current source circuit being connected between the output switch circuit and the bypass circuit, and a ground voltage, wherein the first, second, third, and fourth current source circuits supply a current during logic output, and the second and fourth current source circuits supply a current, and the first and third current source circuits do not supply a current during high impedance output.

9. The LVDS driver circuit according to claim 7, further comprising:

a first current source circuit and a second current source circuit being connected between the output switch circuit and the bypass circuit, and a power supply voltage; and a third current source circuit and a fourth current source circuit being connected between the output switch circuit and the bypass circuit, and a ground voltage, wherein the first, second, third, and fourth current source circuits supply a current during logic output, and the second and fourth current source circuits supply a current, and the first and third current source circuits do not supply a current during high impedance output.

10. The LVDS driver circuit according to claim 1, wherein the bypass circuit comprises a first transistor including a source being connected to a first node of the output switch circuit and a drain being connected to the intermediate node of the bypass circuit, and a second transistor including a source being connected to a second node of the output switch circuit and a drain being connected to the intermediate node of the bypass circuit.

11. The LVDS driver circuit according to claim 10, further comprising:

a first current source circuit and a second current source circuit being connected between the output switch circuit and the bypass circuit, and a power supply voltage; and a third current source circuit and a fourth current source circuit being connected between the output switch circuit and the bypass circuit, and a ground voltage, wherein the first, second, third, and fourth current source circuits supply a current during logic output, and the second and fourth current source circuits supply a current, and the first and third current source circuits do not supply a current during high impedance output.

12. The LVDS driver circuit according to claim 1, further comprising:

a first current source circuit and a second current source circuit being connected between the output switch circuit and the bypass circuit, and a power supply voltage; and a third current source circuit and a fourth current source circuit being connected between the output switch circuit and the bypass circuit, and a ground voltage, wherein the first, second, third, and fourth current source circuits supply a current during logic output, and the second and fourth current source circuits supply a current, and the first and third current source circuits do not supply a current during high impedance output.

13. A driver circuit for outputting a signal of logic output or high impedance output through a first output terminal and a second output terminal, comprising:

a first current source being connected to a first node;
a second current source being connected to a second node;

a first resistor pair comprising a first termination resistor and a second termination resistor being connected in series with each other between the first and second output terminals, an intermediate node of the first and second termination resistors being supplied with a termination voltage;

a first transistor pair comprising a first transistor and a second transistor being connected in series with each other between the first and second nodes, an intermediate node of the first and second transistors being connected to the first output terminal;

a second transistor pair comprising a third transistor and a fourth transistor being connected in series with each other and in parallel with the first transistor pair, an intermediate node of the third and fourth transistors being connected to the second output terminal; and a third transistor pair comprising a fifth transistor and a sixth transistor being connected in series with each other and in parallel with the first and second transistor pairs, an intermediate node of the fifth and sixth transistors being at substantially the same voltage as the termination voltage, wherein the first and fourth transistors, or, the second and third transistors connect the first and second current sources, and the first and second output terminals during logic output, and the fifth and sixth transistors connect the first and second current sources during high impedance output, and a voltage of the first and second nodes during the logic output is substantially the same as a voltage of the first and second nodes during the high impedance output.

14. The driver circuit according to claim 13, further comprising:

a differential amplifier, in which a first input terminal is connected to the intermediate node of the first resistor pair, a second input terminal is connected to an output terminal, and the output terminal is connected to the intermediate node of the third transistor pair.

15. The driver circuit according to claim 14, further comprising:

a third current source being connected to the first node; and a fourth current source being connected to the second node, wherein the first and fourth transistors, or, the second and third transistors connect the first and third current sources, the second and fourth current sources, and the first and second output terminals during the logic output, and the fifth and sixth transistors connect the first and second current sources, and do not connect the third and fourth current sources during the high impedance output.

16. The driver circuit according to claim 13, further comprising:

a second resistor pair comprising a third resistor and a fourth resistor being connected in series with each other and in parallel with the first resistor pair; and a differential amplifier, in which a first input terminal is connected to the intermediate node of the second resistor pair, a second input terminal is connected to an output terminal, and the output terminal is connected to the intermediate node of the third transistor pair.

17. The driver circuit according to claim 16, further comprising:

a third current source being connected to the first node; and a fourth current source being connected to the second node, wherein the first and fourth transistors, or, the second and third transistors connect the first and third current sources, the second and fourth current sources, and the first and second output terminals during the logic output, and the fifth and sixth transistors connect the first and second current sources, and do not connect the third and fourth current sources during the high impedance output.

18. The driver circuit according to claim 13, wherein a current on the first and second nodes during the high impedance output is smaller than a current on the first and second nodes during the logic output.

19. The driver circuit according to claim 13, further comprising:

a third current source being connected to the first node; and a fourth current source being connected to the second node, wherein the first and fourth transistors, or, the second and third transistors connect the first and third current sources, the second and fourth current sources, and the first and second output terminals during the logic output, and the fifth and sixth transistors connect the first and second current sources, and do not connect the third and fourth current sources during the high impedance output.

* * * * *